United States Patent
Tamai

[11] Patent Number: 5,600,196
[45] Date of Patent: Feb. 4, 1997

[54] VIBRATION DRIVEN MOTOR

[75] Inventor: Jun Tamai, Yokohama, Japan

[73] Assignee: Canon Kabushiki Kaisha, Tokyo, Japan

[21] Appl. No.: 415,673

[22] Filed: Apr. 3, 1995

Related U.S. Application Data

[63] Continuation of Ser. No. 126,028, Sep. 24, 1993, abandoned, which is a continuation of Ser. No. 858,437, Mar. 24, 1992, abandoned, which is a continuation of Ser. No. 533,534, Jun. 5, 1990, abandoned.

[30] Foreign Application Priority Data

Jun. 5, 1989  [JP]  Japan ..................... 1-142339

[51] Int. Cl.⁶ .................. H02N 2/00; H01L 41/08
[52] U.S. Cl. ................................................ 310/323
[58] Field of Search ............................ 310/323, 325

[56] References Cited

U.S. PATENT DOCUMENTS

| | | | |
|---|---|---|---|
| 4,691,724 | 9/1987 | Garcia et al. | 134/169 |
| 4,697,117 | 9/1987 | Mishiro | 310/323 |
| 4,728,843 | 3/1988 | Mishiro | 310/325 |
| 4,812,697 | 3/1989 | Mishiro | 310/323 |
| 4,833,359 | 5/1989 | Tanoue et al. | 310/316 |
| 4,868,446 | 9/1989 | Kumada | 310/323 |
| 4,882,500 | 11/1989 | Iijima | 310/323 |
| 4,893,045 | 1/1990 | Honda | 310/323 |
| 5,008,581 | 4/1991 | Kumada et al. | 310/323 |

FOREIGN PATENT DOCUMENTS

| | | | |
|---|---|---|---|
| 0231940 | 8/1987 | European Pat. Off. | H01L 41/08 |
| 0301429 | 2/1989 | European Pat. Off. | H01L 41/08 |
| 2809820 | 9/1978 | Germany | H01L 41/10 |
| 58-99760 | 6/1983 | Japan | G01R 1/67 |
| 59-96881 | 6/1984 | Japan | H02N 11/00 |
| 62-141980 | 6/1987 | Japan | H02N 2/00 |
| 62-239875 | 10/1987 | Japan | H02N 2/00 |
| 63-214381 | 9/1988 | Japan | B06B 1/06 |
| 0240380 | 10/1988 | Japan | 310/323 |
| 116275 | 1/1989 | Japan | H02N 2/00 |
| 0091668 | 3/1992 | Japan | 310/323 |

OTHER PUBLICATIONS

"Ultrasonics" Reprint From 'News in Engineering', Jan. 1966, published by College of Engineering, Ohio State University.

*Primary Examiner*—Thomas M. Dougherty
*Attorney, Agent, or Firm*— Fitzpatrick, Cella, Harper & Scinto

[57] ABSTRACT

A vibration driven motor is arranged so that a vibration member and a movable member are moved relative to each other by utilizing non-travelling vibration. A supporting member for the motor is disposed at the position of the loop of the aforesaid vibration.

18 Claims, 6 Drawing Sheets

VIBRATION DRIVEN MOTOR

This application is a continuation of application Ser. No. 08/126,028 filed Sep. 24, 1993 now abandoned, which is a continuation of prior application Ser. No. 07/858,437 filed Mar. 24, 1992 now abandoned, which is a continuation of prior application Ser. No. 07/533,534 filed Jun. 5, 1990 now abandoned.

BACKGROUND OF THE INVENTION

1. Field of the Invention

The present invention relates generally to a motor for generating mechanical power without using electromagnetic force and, more particularly, to a vibration driven motor.

2. Related Background Art

Conventional types of vibration driven motors are disclosed in, for example, Japanese Patent Laid-Open Nos. 62-141980, 63-214381, and 59-96881.

As shown in FIG. 11, such a motor includes a vibration member 100 made from a metallic round bar of horn shape whose root portion gradually decreases in outer diameter, a pressure member 101 made from an annular metallic member having the same outer diameter as the large-diameter portion of the vibration member 100, and two annular electrostrictive plates 102 and 103 disposed between the vibration member 100 and the pressure member 101. The pressure member 101 is fixed to the vibration member 100 by a bolt 104, and the electrostrictive plates 102 and 103 are pressed against each other. Each of the electrostrictive plates 102 and 103 has two electrodes symmetrically divided on one face, and a common electrode formed on the other face of each of the electrostrictive plates 102 and 103. The polarization direction of the two divided electrodes of the electrostrictive plate 102 and 103 differ from each other. Electrode plate 106 is disposed between the electrostrictive plates 102 and 103. The electrode plate 106 is disposed in contact with the divided electrodes of the electrostrictive plate 102 positioned on the front side, while the electrode plate 105 is disposed in contact with the common electrode of the electrostrictive plate 103 positioned on the rear side. The common electrode of first plate 102 is disposed in contact with vibration member 100.

When AC voltages, which are equal in amplitude and frequency, are respectively applied across the first plate 102 and the second plate 103 with a phase difference in time, vibration in which the vibration of the electrostrictive plate 102 is combined with that of the electrostrictive plate 103 is generated in the vibration member. The combined vibration cause a rotating motion at the tip of the vibration member moving forwardly and backwardly in the longitudinal direction of the vibration member.

FIG. 12 shows a conventional vibration driven motor which utilizes such a vibration member as a driving source. The extending end of the vibration member is pressed in contact with one face of a disk 108 to frictionally drive the disk 108 by the circular motion of the extending end of the vibration member. Thus, rotational torque is transmitted from a rotary shaft 109 fixed to the center of the disk 108.

In the above-described conventional arrangement, the vibration member does not vibrate at its extending end only, but the entire vibration assembly constitutes one vibration system. It is, therefore, necessary to support the vibration member while minimizing the influence of vibration on the same.

The vibration driven motor utilizing such a vibration member has another difficulty. For example, although the motor makes use of the motion of the extending end of the vibration member, it has been found from the experiments conducted by the present inventor that the rotational torque of the extending end of the vibration member is weak and sufficient driving torque cannot be applied to the disk which is a driven member.

SUMMARY OF THE INVENTION

It is therefore an object of the present invention to provide a vibration driven motor capable of supporting a vibration member while minimizing the influence of vibration on the same.

It is another object of the present invention to provide a vibration driven motor capable of applying sufficient torque to a vibration member and efficiently creating rotational torque, and of supporting the vibration member while minimizing the influence of vibration on the same.

It is another object of the present invention to provide a vibration driven motor which has no fear of damaging a device in which it is incorporated.

To achieve the above and other objects, according to the present invention, there is provided a vibration driven motor in which a vibration member and a movable member are moved relative to each other by utilizing non-travelling vibration, a supporting member for the motor being disposed at the position of the loop of the aforesaid vibration.

The above and other objects, features and advantages of the present invention will be apparent from the following description of preferred embodiments of the invention with reference to the accompanying drawings.

DESCRIPTION OF THE PREFERRED EMBODIMENTS

Preferred embodiments of the present invention will be described below in detail with reference to the accompanying drawings.

First Embodiment

Figure 1:
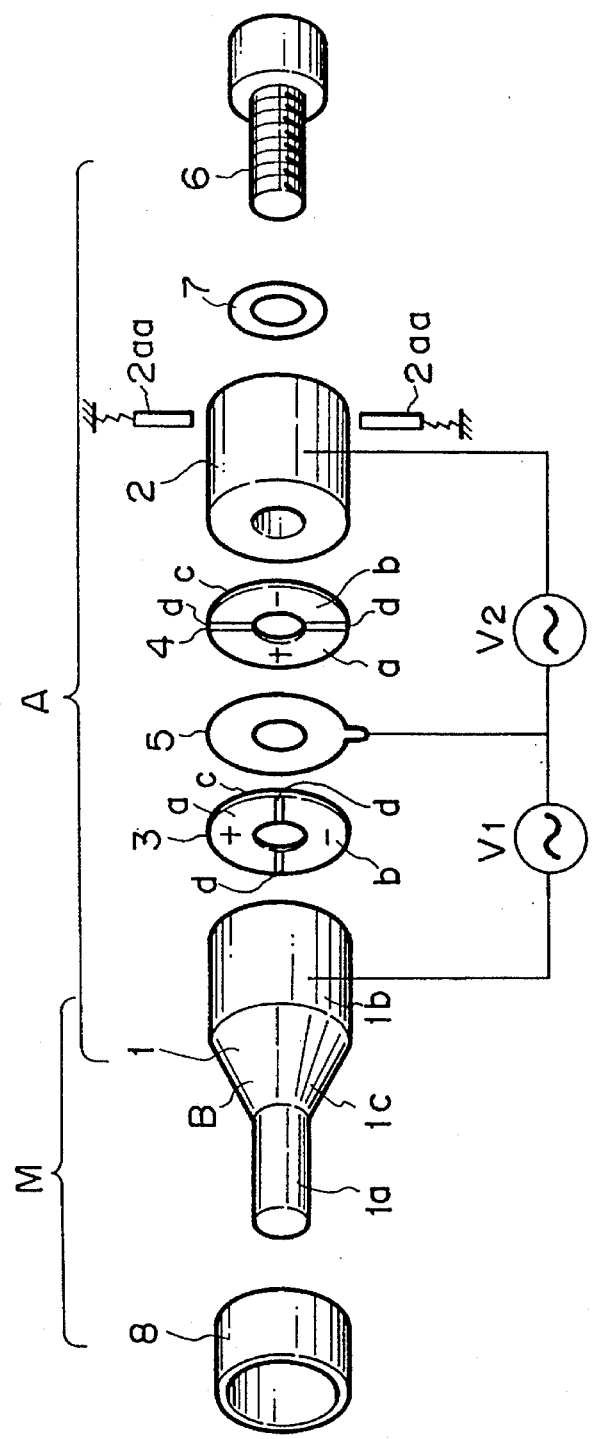
FIG. 1 is an exploded perspective view showing a first embodiment of a vibration driven motor according to the present invention.

FIG. 1 is an exploded perspective view showing a first embodiment of a vibration driven motor according to the present invention.

A vibration assembly A includes a vibration member 1 made from a rod-like metallic member. The vibration member 1 is of a cylindrical configuration and includes a small-diameter portion 1a which constitutes a first end portion, a large-diameter portion 1b which constitutes a second end portion, and a horn-shaped portion 1c having a diameter which is gradually reduced along the axis toward the first end. The vibration assembly A also includes a pressure member 2 made from a rod-like metallic member having an outer diameter which is the same as the diameter of the large-diameter portion 1b, and plates 3 and 4 each of which is made from a disk-shaped piezoelectric element having the same outer diameter as the large-diameter portion 1b. The piezoelectric plates 3 and 4 serve as electrical-to-mechanical energy transducers, respectively, and are disposed between the vibration member 1 and the pressure member 2 in such a manner that they sandwich an electrode plate 5. The pressure member 2 is secured to the vibration member 1 by means a bolt 6 so that the piezoelectric plates 3 and 4 are secured in position between the vibration member 1 and the pressure member 2. The head of the bolt 6 is held against the pressure member 2 with an annular insulating member 7 interposed therebetween, while the shaft of the bolt 6 is held in non-contact with the piezoelectric plates 3 and 4 and the electrode plate 5.

Each of the piezoelectric plates 3 and 4 is polarized on one side in the direction of the thickness thereof so as to have two opposite electrodes, i.e., a positive electrode a and a negative electrode b. These electrodes a and b are symmetrically formed with respect to an insulating portion d which crosses the central axis of the vibration assembly A. As illustrated, the piezoelectric plates 3 and 4 are combined so that their directions of polarization differ from each other. Each of the piezoelectric plates 3 and 4 further has a common electrode c shared by the positive and negative electrodes a and b on the other side. The positive and negative electrodes a and b are disposed out of phase with each other by an angle of 90 degrees with respect to the axis of the vibration assembly A, and the common electrode c of the piezoelectric plate 3 and the polarized side of the piezoelectric plate 4 are disposed in contact with the respective sides of the electrode plate 5. The polarized side of the piezoelectric plate 3, i.e., the positive electrode a and the negative electrode b, are maintained in contact with the first end face of the vibration member 1 serving as a conductor, while the common electrode c of the piezoelectric plate 4 is maintained in contact with the first end face of the pressure member 2.

An AC voltage $V_1$ is applied across the electrode plate 5 and the vibration member 1, while an AC voltage $V_2$ is applied across the electrode plate 5 and the pressure member 2, whereby the piezoelectric plate 3 and the piezoelectric plate 4 vibrate while expanding and contracting in the directions of their respective thicknesses. The resulting vibrations of the respective plates 3 and 5 in the direction of deflection are combined to vibrate the vibration assembly A.

The above-described vibration is a vibration which results from a combination of bending vibrations which are generated in different directions in a plane perpendicular to an axis 1 of the vibration assembly A. Such a combined vibration may be called a non-traveling vibration which does not propagate along the axis of the vibration assembly A. In another aspect, the combined vibration is a vibration whose node and loop are not displaced along the axis of the rod-like vibration assembly A.

Figure 2:
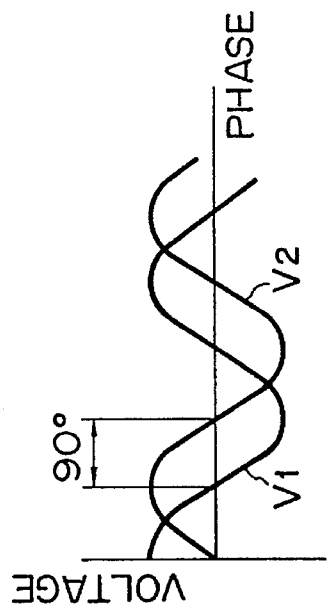
FIG. 2 is a waveform diagram of an AC source which is applied across a piezoelectric sheet.

As shown in FIG. 2, the AC voltage $V_1$ and the AC voltage $V_2$ are equal to each other in amplitude and frequency, but are 90° out of phase with each other. It follows, therefore, that the vibration assembly A is eccentrically displaced in response to the applied electrical signal, and makes a circular motion about its axis. Since the principle of the circular motion is known, explanation is omitted.

If the opposite ends of the vibration assembly A are assumed to be free ends, respectively, the loop of the vibration is positioned at each of the opposite ends. Accordingly, because of the configuration of the vibration assembly A, the diameter of the circular motion of the vibration member 1 at the first end of the vibration member 1 becomes even larger than the diameter of the second end of the pressure member 2, but torque caused by the circular motion at the first end of the vibration member 1 is made small.

In the first embodiment, the resonance frequency of the vibration assembly A is selected so that the loop of the vibration of the vibration assembly A is positioned at a first end B (hereinafter referred to as a "frictional moving portion") of the horn portion 1c of the vibration member 1. The piezoelectric plates 3 and 4 are actuated at that resonance frequency.

Figure 3A:
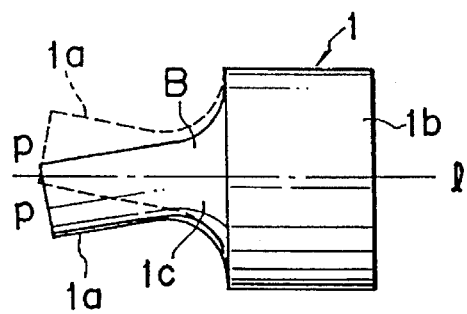
FIG. 3A is a side elevational view showing the oscillating motion of a vibration member for use in the first embodiment.
Figure 3B:
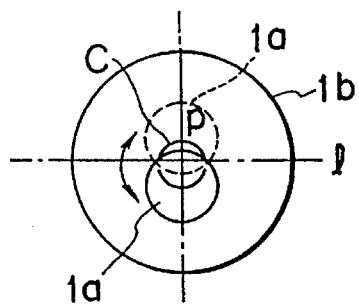
FIG. 3B is a front elevational view showing the oscillating motion of the vibration member for use in the first embodiment.

More specifically, the vibration assembly A vibrates in the mode of three nodes or more with the loop of the vibration positioned at least at the opposite ends and frictional moving portion B of the vibration assembly A. Accordingly, the vibration member 1 makes an oscillating motion in such a manner that the horn portion 1c and the small-diameter portion 1a are oscillated about the axis 1, as shown in FIGS. 3A and 3B, while a central point P at the first end of the small-diameter portion 1a is travelling around the circumference of a circle C, as shown in FIG. 3B. A rotor 8, which will be explained later, is rotated around the axis 1 by utilizing the oscillating motion at the frictional moving portion B. The torque produced at the frictional moving portion B is even greater than that produced at the first end of the small-diameter portion 1a.

Figure 4:
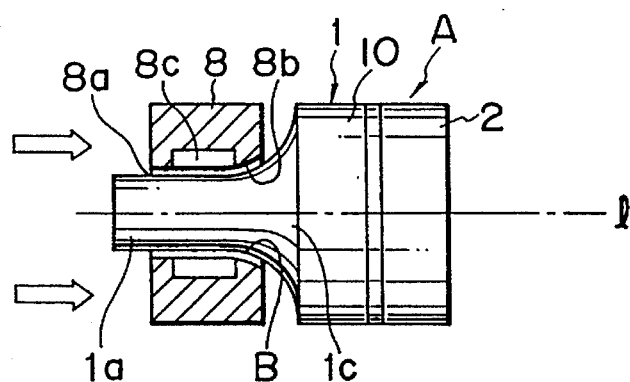
FIG. 4 is a cross-sectional side elevational view showing the manner in which the first embodiment of the vibration driven motor is mounted.

The rotor 8 is engaged with the small-diameter portion 1a along the axis 1 of the vibration assembly A, and a second end (hereinafter referred to as a "frictional contact portion") 8b of an inner-diameter portion 8a of the rotor 8 is located at a position corresponding to the frictional moving portion B, whereby the second end of the frictional contact portion 8b is engaged with the horn portion 1c. As shown in FIG. 4, the inner diameter of the inner-diameter portion 8a of the rotor 8 is selected to be slightly larger than the outer diameter of the small-diameter portion 1a of the vibration assembly A so as to accommodate the oscillating motion of the small-diameter portion 1a. The lengthwise central portion 8c of the inner diameter 8a is formed to have a far larger inner diameter so that it is prevented from coming into contact with the small-diameter portion 1a.

The frictional contact portion 8b of the rotor 8 is formed to become gradually wider toward the first end so as to match the outer configuration of the frictional moving portion B. The frictional contact portion 8b comes into line contact with the frictional moving portion B during the oscillating motion of the vibration member 1.

The rotor 8 is urged in the direction of the arrows shown in FIG. 4 through a thrust bearing (not shown) by a spring or the like (not shown), thereby generating a predetermined frictional force at the area of contact between the frictional contact portion 8b and the frictional moving portion B. The aforesaid thrust bearing allows the rotor 8 to rotate about the axis thereof.

Figure 5:
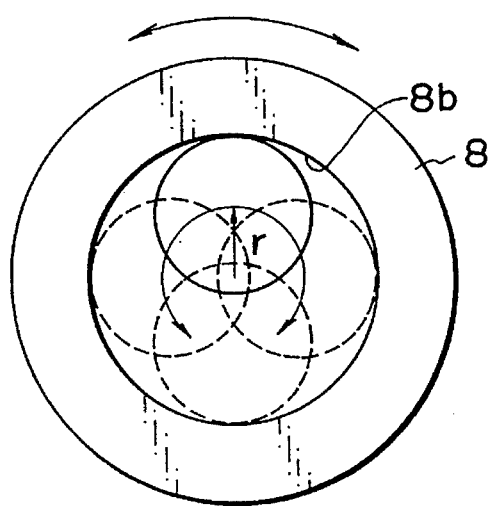
FIG. 5 is a schematic view showing the manner in which the first embodiment of the vibration driven motor is driven.

More specifically, when the vibration assembly A vibrates with the loop thereof positioned at the frictional moving portion B, that is, in the mode of three nodes, the vibration member 1 makes the above-described oscillating motion about the axis l as shown in FIG. 3. Accordingly, as shown in FIG. 5, the frictional moving portion B makes a circular motion in contact with the frictional contact portion 8b of the rotor 8 while drawing a locus of predetermined radius r with respect to the axis l in the clockwise or counterclockwise direction. In FIG. 5, the outer diameter of the frictional moving portion B is shown as being much smaller than the inner diameter of the frictional contact portion 8b of the rotor 8 for the purpose of illustrating the manner in which the frictional moving portion B makes the circular motion in frictional contact with the inner periphery of the frictional contact portion 8b of the rotor 8. However, in practice, since the radius of the oscillating motion of the frictional moving portion B is extremely small, the gap between the frictional moving portion B and the frictional contact portion 8b of the rotor 8 is extremely small.

As described above, not only does the vibration member 1 vibrate, but the vibration assembly A vibrates as a whole. Accordingly, when a vibration driven motor M including the above-described arrangement is to be mounted in a device such as a camera or a printer, it is necessary to consider a supporting method for the vibration assembly A and associated elements.

A method of supporting the vibration assembly A at the nodal position of vibration seems to be optimum because the vibration is small in amplitude. However, since the vibration assembly A makes an oscillating motion which starts on the nodal position of vibration, a plane perpendicular to the axis l at the nodal position of the vibration is made to oscillate in the direction of the axis l.

For this reason, if a motor mounting flange extends from the position on the vibration assembly A which corresponds to the nodal position of vibration, that is, the outer periphery of the vibration member 1 or the pressure member 2, that flange vibrates back and forth in the axial direction and a mounting portion for the aforesaid device such as a camera or a printer may be at worst broken due to vibrations. For this reason, it is inappropriate to support the vibration assembly A at the nodal position of vibration.

From examinations of the state of vibration of the vibration assembly A in various aspects, it is found that the position of the loop of vibration, which may seem inappropriate, is appropriate for a supporting position for the vibration assembly A.

More specifically, although the amplitude of vibration is large at the position of the loop thereof, the vibration assembly is only displaced in the radial direction thereof, whereby the above-described fluctuating motion can be prevented. As can be seen from the structure of the vibration driven motor M, the loop position of vibration which serves as the supporting position is selected at a location axially rearwardly from the frictional moving portion B. Accordingly, if the vibration assembly A is to be vibrated in the mode of three nodes, the supporting position corresponds to the second end of the vibration assembly, while if the vibration assembly A is to be vibrated in the mode of four nodes, the supporting position is located at the second end of the vibration assembly A or between the second end of the vibration assembly A and the frictional moving portion B.

The amplitude of vibration of the vibration assembly A is extremely small, and the amplitude of variation at the loop position serving as the supporting position is far smaller than the amplitude of the variation of the frictional moving portion B for actuating the rotor 8. Accordingly, radial displacement can be substantially ignored, and the vibration assembly A can be stably mounted in a device by selecting the supporting position for the vibration assembly A as the loop position of vibration.

In FIG. 1, reference numeral 2aa denotes a supporting member which is provided at the loop position of the vibration of the vibration driven motor M. In a case where the second end of the vibration assembly A is selected as the supporting position as shown in FIG. 1, if that second end is secured to the securing member of a device or the like, the vibration assembly A assumes a vibration mode at the nodal positions which correspond to the opposite ends of the vibration assembly A. As a result, since the loop is not formed at the frictional moving portion B, it is necessary to provide support so as to allow radial displacement. Although it is desirable that the position where the aforesaid supporting member is located accurately corresponds to the position of the loop, the former position is not limited only to the position of the loop and, for example, it may be located in the vicinity of the same.

Second Embodiment

Figure 6:
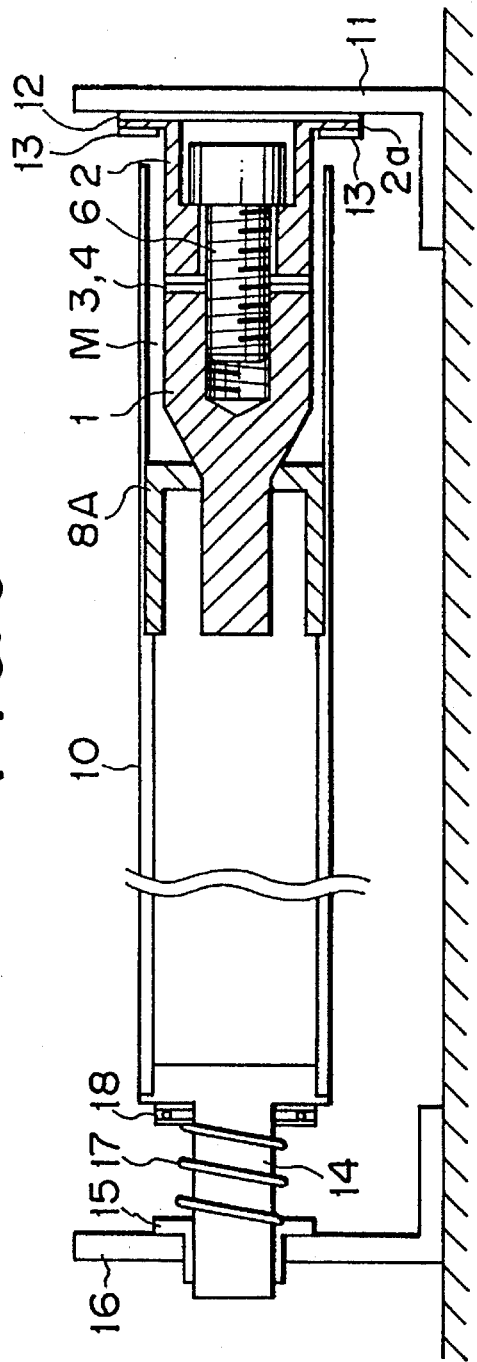
FIG. 6 is a cross-sectional, side elevational view showing a second embodiment of the vibration driven motor according to the present invention.

FIG. 6 is a cross-sectional, side elevational view showing, with a portion broken away, a second embodiment of the present invention.

In the second embodiment, the vibration driven motor M, which includes a rotor different from that of the vibration driven motor M used in the first embodiment and which utilizes the same supporting structure as the vibration driven motor M, is used for a drive source for driving the platen roller of a printer. As shown in FIG. 6, the vibration driven motor M including the vibration assembly A and a rotor 8A is accommodated in one end portion of a platen roller 10. The vibration driven motor M also serves as a supporting shaft for one end of the platen roller 10.

The vibration driven motor M has a securing flange 2a formed at the second end of the pressure member 2 to support the second end of the pressure member 2 of the vibration assembly A. The flange 2a is mounted on a printer mounting frame 11 with a low-friction sheet 12 made from a low-friction material such as teflon or the like interposed therebetween. The flange 2a has openings (not shown), and screws 13, whose shafts are smaller than the inner diameters of the respective openings, are inserted through the corresponding openings and threadedly fitted into the mounting frame 11. In this manner, the movement of the vibration driven motor M in the axial direction is restricted, but the expansion and contraction of the flange 2a in the radial direction is allowed.

The platen roller 10 is rigidly fitted onto the rotor 8A of the incorporated vibration driven motor M so that the rotational force of the rotor 8A is directly transmitted to the platen roller 10. A supporting shaft 14 is fixed to the other end of the platen roller 10. The supporting shaft 14 is supported by a printer mounting frame 16 for rotation about its axis and for movement along its axis. A spring 17 is resiliently fitted onto the supporting shaft 14, and one end of the spring 17 is pressed against a thrust bearing 18, while the other end is pressed against a bearing 15. The spring force of the spring 17 acts to press the rotor 8A against the vibration assembly A and enable the roller 10 to rotate about its axis.

Third Embodiment

Figure 7:
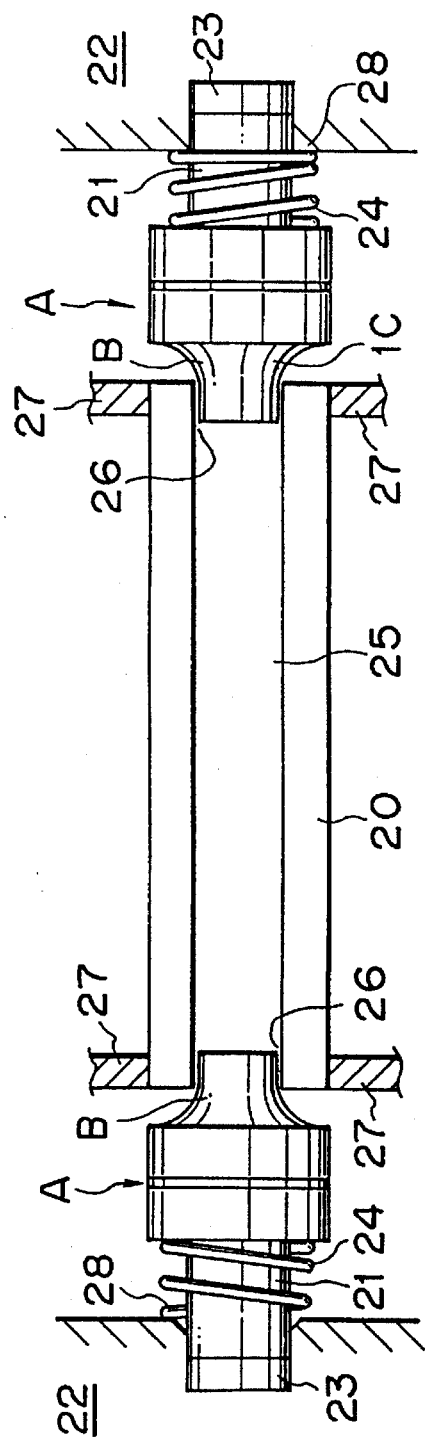
FIG. 7 is a cross-sectional, side elevational view showing a third embodiment of the vibration driven motor according to the present invention.

FIG. 7 is a cross-sectional, side elevational view showing a third embodiment of the present invention.

In the third embodiment, the vibration assemblies A are respectively disposed at the opposite ends of a cylindrical rotor 20 so that the rotor 20 is rotated by means of the two vibration assemblies A. A supporting shaft 21 extends rearwardly from the rear end of each of the vibration assemblies A to be fitted into a mounting hole 23 formed in a adjacent mounting member 22. A spring 24 is, as shown, resiliently fitted onto the shaft 21 so that the horn portion 1c of the vibration assembly A is pressed against a corresponding end portion 26 of the axial bore 25 of the rotor 20. The end portion 26 of the axial bore 25 of the rotor 20 is formed in a manner similar to that of the friction contact portion 8b of the rotor shown in the first embodiment, and corresponds to the frictional moving portion B of the vibration assembly A. The rotor 20 is rotatably supported at the opposite ends of its outer periphery by bearing members 27, whereby the rotor 20 is prevented from being shifted in the radial direction owing to the oscillating motion of the vibration assemblies A and the oscillating motion of the vibration assemblies A can be transformed into rotational force.

When the supporting shafts 21 are fixed in the respective mounting holes 23, vibration mode may be changed as described above. In the third embodiment, to assure the degree of freedom of the supporting shafts 21 in the radial direction, the open end of each mounting hole 23 is defined by a tapered periphery 28.

The rotor 20 of the third embodiment may also be used as a platen roller for a printer such as that described in the second embodiment.

Fourth Embodiment

Figure 8:
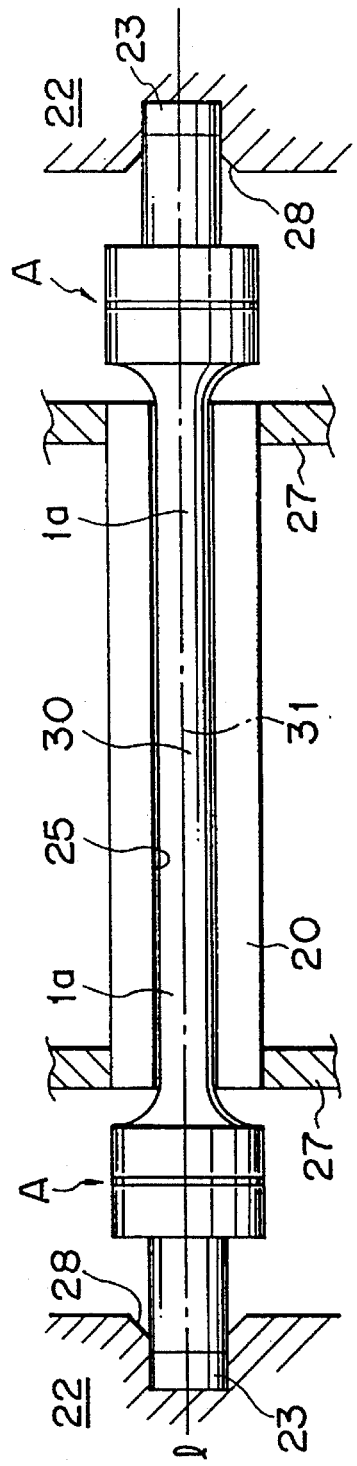
FIG. 8 is a cross-sectional, side elevational view showing a fourth embodiment of the vibration driven motor according to the present invention.

FIG. 8 is a cross-sectional view, side elevational view showing a fourth embodiment of the present invention.

In the above-described third embodiment, the vibration assemblies A are respectively disposed at the opposite ends of the roller 20, and frictional contact between the frictional moving portion B of each vibration assembly A and the end portion of the axial bore 25 of the roller 20 is utilized to transform the oscillating motion of the frictional moving portions B into the rotation of the rotor 20. In contrast, in the fourth embodiment, the small-diameter portions 1a of the respective vibration assemblies A are extended toward each other and joined together.

A vibration driven motor having the above-described arrangement is driven so that vibration in the mode of, for example, three nodes are produced in each vibration assembly A, as in each of the embodiments described above. In such driving, a shaft 30, which consists of the joined small-diameter portions 1a to serve as a substantially integrated vibration assembly, is vibrated with the loop of vibration located at the lengthwise central portion of the shaft 30 and the frictional moving portions B. With respect to the lengthwise central portion of the shaft 30, the shaft 30 makes a circular motion of a predetermined radius about the axis l, whereas, with respect to the whole of the shaft 30, the shaft 30 makes a so-called skipping motion like a skipping rope which is being turned by two opposing persons.

In the fourth embodiment, the loop of vibration produced at the lengthwise central portion 31 of the shaft 30 is utilized to cause the roller 20 to rotate by means of frictional contact between the central portion 31 and the inner periphery of the axial bore 25 of the roller 20. Unlike the above-described embodiment, in the fourth embodiment, the frictional moving portions B of the respective vibration assemblies A are not utilized to rotate the rotor 20. However, since driving is accomplished by the two vibration assemblies A, large torque for frictional driving can be obtained at the central portion 31 of the shaft 30, whereby the rotor 30 can be reliably rotated. If necessary, it is also possible to utilize oscillating motion generated at the frictional moving portions B.

Figure 9:
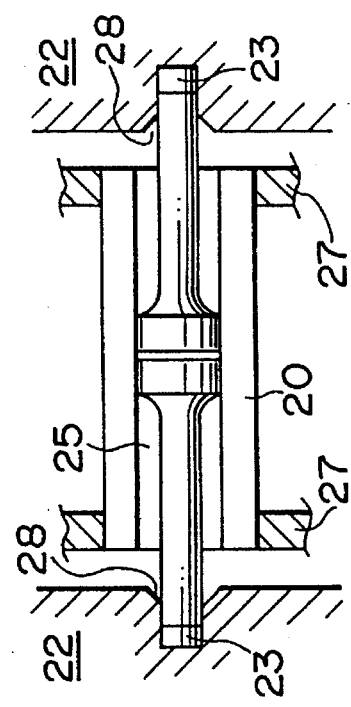
FIG. 9 is a cross-sectional, side elevational view showing a modification of the fourth embodiment of the vibration driven motor according to the present invention.

FIG. 9 is a schematic cross-sectional view showing a modification of the fourth embodiment according to the present invention. The two vibration members 1 and 1 are disposed so that their rear ends may face each other in the axial bore 25 of the rotor 20 and sandwich the piezoelectric disks 3 and 4 therebetween, thereby constituting one vibration assembly. The small-diameter portions 1a of the vibration members 1 and 1 are inserted into the respective axial bores 23 of the mounting member 22.

More specifically, the skipping motion with the loop of vibration formed at the sandwiching position of the piezoelectric disks is utilized to cause the rotor 20 to be rotated owing to frictional contact between the large-diameter portions 1b of the respective vibrating members 1 and 1 and the inner periphery of the axial bore 25 of the rotor 20. In this arrangement, since the large-diameter portions 1b of the respective vibration members 1 and 1 are accommodated in the rotor 20, space savings can be improved.

Fifth Embodiment

Figure 10:
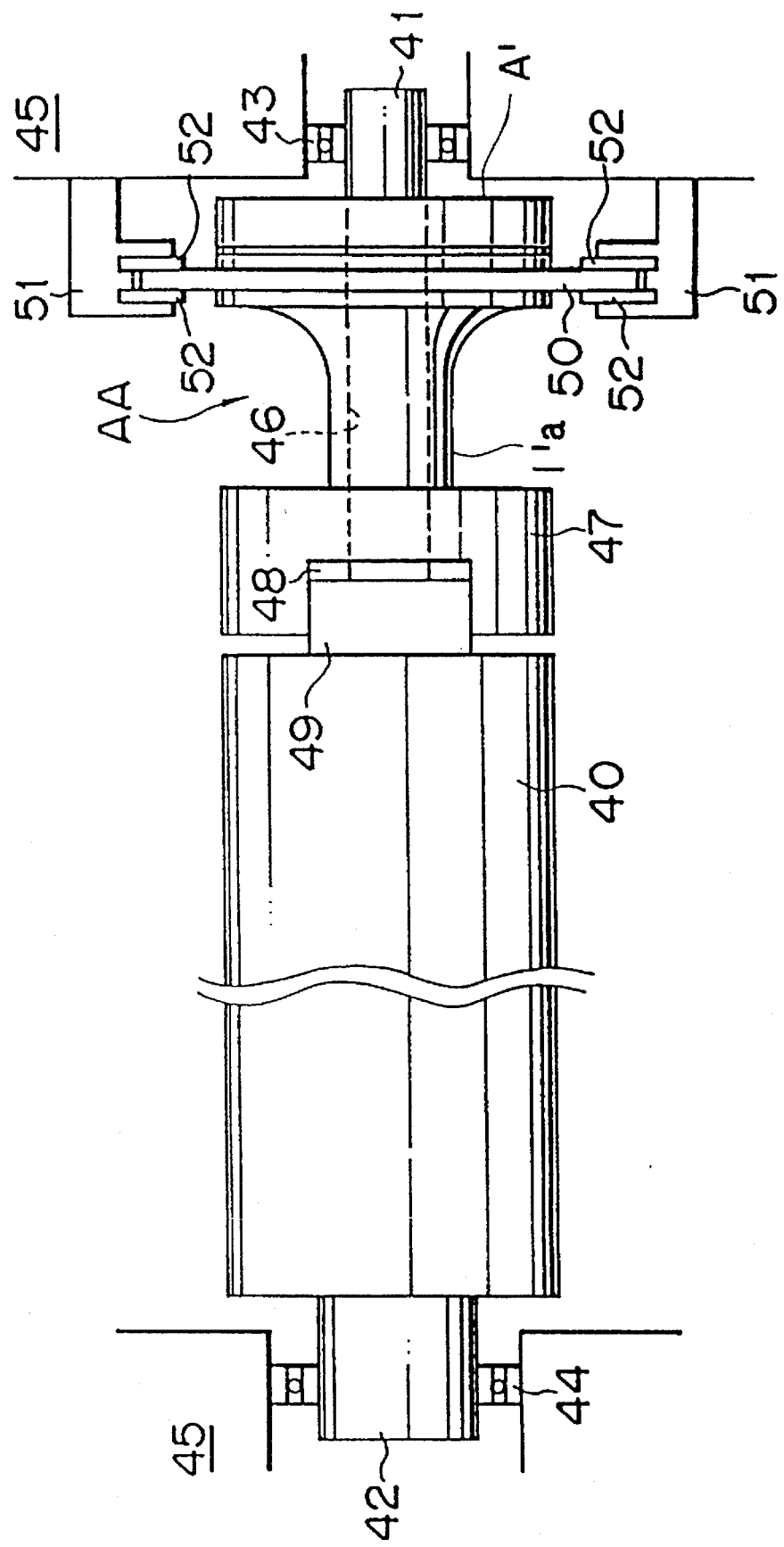
FIG. 10 is a cross-sectional view of, with a portion broken away, a fifth embodiment of the present invention.
Figure 11:
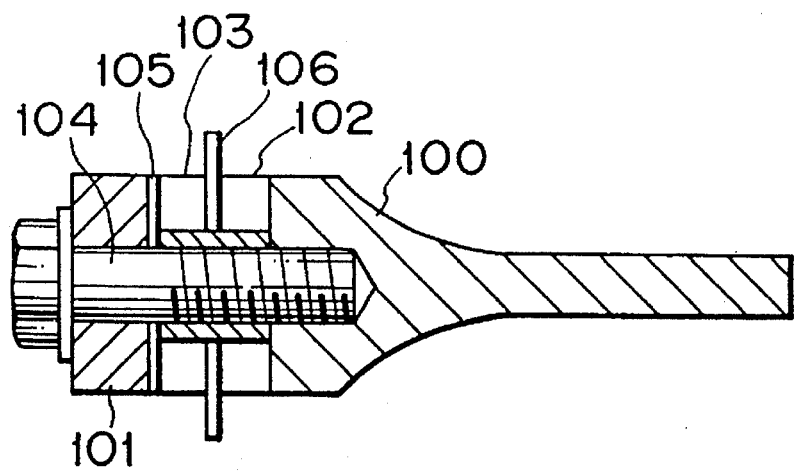
FIG. 11 is a schematic cross-sectional view showing a conventional vibration member.
Figure 12:
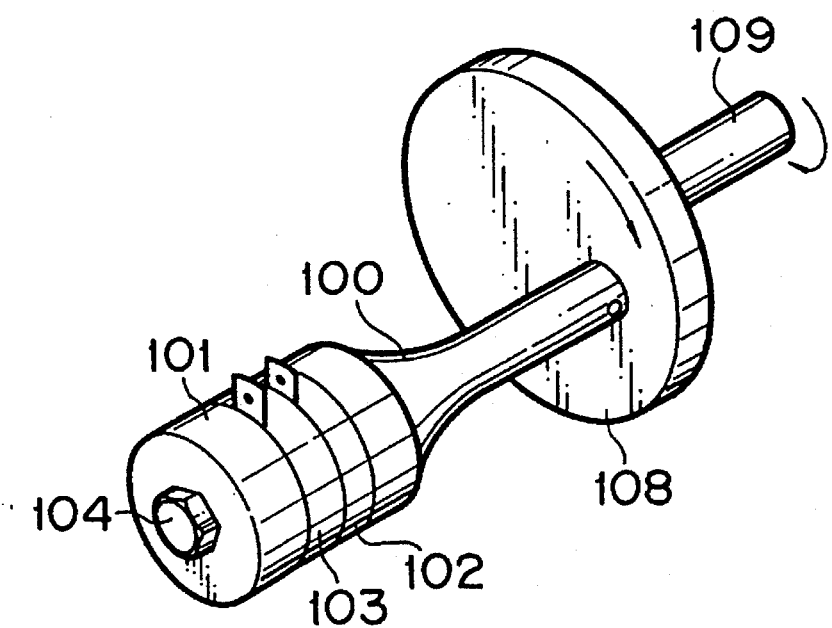
FIG. 12 is a schematic perspective view showing a vibration driven motor utilizing the conventional vibration member.

FIG. 10 is a schematic cross-sectional view showing a fifth embodiment of the present invention.

In each of the above-described embodiments 2 and 3, the rotor (roller) is supported by the bearing members 27. However, in the fifth embodiment, supporting shafts 41 and 42 extend from the respective ends of the roller 40, and the supporting shafts 41 and 42 are rotatably secured to a mounting member 45 by means of bearings 43 and 44, respectively.

An axial bore 46 is formed to extend through a vibration assembly AA of a vibration driven motor A' for driving the roller 40, and the supporting shaft 41 is inserted through the axial bore 46. The supporting shaft 41 and the axial bore 46 are coaxially disposed.

The vibration assembly AA has a cylindrical vibration member 47 formed integrally with a small-diameter portion 1'a, and the contact portion of the cylindrical vibration member 47 has an engagement opening 48 of circular shape in cross section. The engagement opening 48 is engaged with a connecting shaft 49 formed at one end of the roller 40. The cylindrical vibration member 47 is oscillated by the motion of the vibration driven motor A' and the roller 40 is rotated by frictional contact with the connecting shaft 49. During this time, since the supporting shafts 41 and 42 extending from the respective opposite ends of the roller 40 are supported by the corresponding bearings 43 and 44, the roller 40 is not displaced in the radial direction during the driving of the vibration assembly AA and the connecting shaft 49 of the roller 40 is consistently maintained in frictional contact with the engagement opening 48 of the cylindrical vibration portion 47.

As shown, a ring-shaped flange 50 (attachment portion) is integrally formed on the portion of the vibration member 47 at which the loop of vibration is formed, such that the small-diameter portion 1'a is intermediate the ring-shaped flange 50 (attachment portion) and the engagement opening 48 (contact portion). A plurality of brackets 51 extend from the mounting member 45, and resilient members 52 made of, for example, rubber, are respectively fitted with the brackets 51. The flange 50 of vibration assembly AA is retained between the brackets 51 so that the radial displacement of the vibration assembly AA can be absorbed by the intervening resilient members 52.

As is apparent from the foregoing, in accordance with the present invention, it is possible to stably support the vibration assembly by locating the loop of vibration of the vibration assembly at the position of the securing member of a device such as a printer.

Since two vibration assemblies are used, it is possible to actuate a movable member by far larger torque.

As described above, the small-diameter shafts of the respective two vibration assemblies may be connected. In this arrangement, if the movable member is driven by skipping motion with the loop of vibration located at the central portion of the connected small-diameter shafts, the movable member can be driven by large torque resulting from the sum of the torques of the two vibration assemblies, when compared to a conventional arrangement in which driving is performed by utilizing the first end of the vibration assembly.

In the arrangement in which the large-diameter shaft of the vibration assembly is disposed in a hollow movable member so that the movable member is rotated by skipping motion, the large-diameter shaft of the vibration assembly can be accommodated in the movable member. Accordingly, space savings can be improved.

In the arrangement in which both rotary shafts of a movable member are rotatably supported by a mounting member and a vibration assembly is inserted through the opening of one rotary shaft, the eccentric displacement or the like of the movable member can be prevented and rotational torque can be efficiently produced.

In the above-described embodiment, the two piezoelectric elements are utilized to generate vibrations in two directions, and a rotor is rotated by force resulting from a combination of the vibrations. However, three or more piezoelectric elements may be offset in position so that vibrations in a plurality of directions can be generated, and the rotor may be driven by force resulting from a combination of the vibrations.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A vibration driven motor, comprising:
   a bar-shaped vibration member having an axial bore extending therethrough, said vibration member including a contact portion, an attachment portion, and an intermediate portion located between said contact portion and said attachment portion, said intermediate portion having an outer diameter that is smaller than an outer diameter of said contact portion; and
   an electro-mechanical energy conversion member, attachable to the attachment portion of said vibration member, for generating a vibration in said vibration member in response to an applied electrical signal.

2. A vibration driven motor according to claim 1, wherein the vibration generated in said vibration member is a combined vibration of a first bending vibration and a second bending vibration.

3. A vibration driven motor according to claim 2, wherein said first bending vibration is generated in a first plane of said vibration member by said conversion member, and said second bending vibration is generated in a second plane of said vibration member, different from said first plane, by said conversion member.

4. A vibration driven motor according to claim 1, wherein the outer diameter of said intermediate portion is smaller than the outer diameter of said contact portion and the outer diameter of said attachment portion.

5. A vibration driven motor according to claim 2, wherein said first bending vibration and said second bending vibration are shifted substantially 90 degrees in phase relative to each other.

6. A vibration driven motor according to claim 4, wherein the vibration generated in said vibration member is a combined vibration of a first bending vibration and a second bending vibration, and wherein said first bending vibration and said second bending vibration are shifted substantially 90 degrees in phase relative to each other.

7. A vibration driven motor according to claim 2, wherein the outer diameter of said intermediate portion is smaller than the outer diameter of said contact portion and the outer diameter of said attachment portion.

8. A vibration driven motor according to claim 3, wherein the outer diameter of said intermediate portion is smaller than the outer diameter of said contact portion and the outer diameter of said attachment portion.

9. A vibration driven motor according to claim 3, wherein said first bending vibration and said second bending vibration are shifted substantially 90 degrees in phase relative to each other.

10. A vibration driven motor, comprising:
    a bar-shaped vibration member having an axial bore extending therethrough, said vibration member including a contact portion, an attachment portion and an intermediate portion located between said contact portion and said attachment portion, said intermediate portion having a rigidity that is smaller than a rigidity of said contact portion; and
    an electro-mechanical energy conversion member, attachable to the attachment portion of said vibration member, for generating a vibration in said vibration member in response to an applied electrical signal.

11. A vibration driven motor according to claim 10, wherein the vibration generated in said vibration member is a combined vibration of a first bending vibration and a second bending vibration.

12. A vibration driven motor according to claim 11, wherein said first bending vibration is generated in a first plane of said vibration member by the conversion member, said second bending vibration is generated in a second plane of said vibration member, different from said first plane, by the conversion member.

13. A vibration driven motor according to claim 10, wherein the rigidity of said intermediate portion is smaller than a rigidity of said contact portion and said attachment portion.

14. A vibration driven motor according to claim 11, wherein said first bending vibration and said second bending vibration are shifted substantially 90 degrees in phase relative to each other.

15. A vibration driven motor according to claim 13, wherein the vibration generated in said vibration member is a combined vibration of a first bending vibration and a second bending vibration, and wherein said first bending vibration and said second bending vibration are shifted substantially 90 degrees in phase relative to each other.

16. A vibration driven motor according to claim 11, wherein the rigidity of said intermediate portion is smaller than the rigidity of said contact portion and the rigidity of said attachment portion.

17. A vibration driven motor according to claim 12, wherein the rigidity of said intermediate portion is smaller than the rigidity of said contact portion and the rigidity of said attachment portion.

18. A vibration driven motor according to claim 12, wherein said first bending vibration and said second bending vibration are shifted substantially 90 degrees in phase relative to each other.

* * * * *

UNITED STATES PATENT AND TRADEMARK OFFICE
CERTIFICATE OF CORRECTION

PATENT NO. : 5,600,196
DATED : February 4, 1997
INVENTOR(S) : JUN TAMAI

It is certified that error appears in the above-indentified patent and that said Letters Patent is hereby corrected as shown below:

On the title page, item
[56] References Cited

FOREIGN PATENT DOCUMENTS

"116275    1/1989    Japan" should read
    --1-16275    1/1989    Japan--.

COLUMN 1

Line 36, "plate" should read --plates--.
    Line 51, "cause" should read --causes--.

COLUMN 3

Line 39, "means" should read --means of--.

COLUMN 7

Line 28, "in a" should read --in an--.

Signed and Sealed this

Eighth Day of July, 1997

Attest:

BRUCE LEHMAN

*Attesting Officer*    *Commissioner of Patents and Trademarks*